US009146847B2

(12) United States Patent
Corrie

(10) Patent No.: US 9,146,847 B2
(45) Date of Patent: Sep. 29, 2015

(54) OPTIMIZING FOR PAGE SHARING IN VIRTUALIZED JAVA VIRTUAL MACHINES

(71) Applicant: VMware, Inc., Palo Alto, CA (US)

(72) Inventor: Benjamin J. Corrie, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 258 days.

(21) Appl. No.: 13/715,539

(22) Filed: Dec. 14, 2012

(65) Prior Publication Data

US 2013/0159639 A1 Jun. 20, 2013

Related U.S. Application Data

(60) Provisional application No. 61/570,634, filed on Dec. 14, 2011.

(51) Int. Cl.
*G06F 12/00* (2006.01)
*G06F 12/10* (2006.01)

(52) U.S. Cl.
CPC ............... *G06F 12/00* (2013.01); *G06F 12/109* (2013.01); *G06F 2212/151* (2013.01); *G06F 2212/656* (2013.01)

(58) Field of Classification Search
None
See application file for complete search history.

(56) References Cited

U.S. PATENT DOCUMENTS

| | | | | |
|---|---|---|---|---|
| 6,427,234 B1 * | 7/2002 | Chambers et al. | ............ | 717/140 |
| 7,237,064 B2 * | 6/2007 | Lewis | ............ | 711/118 |
| 7,293,267 B1 * | 11/2007 | Fresko | ............ | 717/166 |
| 8,612,397 B2 * | 12/2013 | Henderson | ............ | 707/687 |
| 2007/0106716 A1 * | 5/2007 | Corrie | ............ | 707/206 |
| 2008/0034365 A1 * | 2/2008 | Dahlstedt | ............ | 718/1 |
| 2011/0083031 A1 * | 4/2011 | Khunteta | ............ | 714/37 |
| 2012/0096441 A1 * | 4/2012 | Law et al. | ............ | 717/127 |
| 2012/0144139 A1 * | 6/2012 | Brunswig et al. | ............ | 711/163 |
| 2012/0284718 A1 * | 11/2012 | Dahlstedt | ............ | 718/1 |
| 2013/0346376 A1 * | 12/2013 | Dmitriev et al. | ............ | 707/692 |

* cited by examiner

*Primary Examiner* — Kevin Verbrugge

(57) ABSTRACT

Methods, systems, and computer programs manage memory of a runtime environment executing on a virtual machine. A runtime environment, such as a Java Virtual Machine, may deterministically arrange immutable data within memory such that a hypervisor may perform page sharing on the immutable data. The runtime environment may page-align the immutable data within memory. The runtime environment may further store the immutable within memory using self-referenced or self-relative pointers.

20 Claims, 3 Drawing Sheets

OPTIMIZING FOR PAGE SHARING IN VIRTUALIZED JAVA VIRTUAL MACHINES

CROSS-REFERENCE TO RELATED APPLICATION

This application claims the benefit of U.S. Provisional Patent Application Ser. No. 61/570,634, filed Dec. 14, 2011, and entitled "Memory Management Mechanisms in Java Virtual Machines," the entire contents of which are incorporated by reference herein.

BACKGROUND

Virtual computing environments allow multiple virtual machines (VMs) to be run on a single physical platform and to share physical resources. Some virtual computing environments allow configuring the VMs in a way where the total amount of memory designated for use by the VMs is bigger than the actual amount of memory available on the host. This is referred to as memory over-commitment, and it allows more VMs to be packed onto a single host. Some virtual computing environments permit arbitrary boundaries to be placed around computing resources such as memory that may span more than one host. For example, a virtual computing environment may create two VMs, each configured with 4 GB of memory, from a resource pool potentially spanning multiple hosts and having a memory limit of less than the 8 GB required (e.g., a 7 GB memory limit.)

Consolidation of computing systems, which leads to the opportunity to over-commit computing resources, such as memory, is one of the key benefits of virtualization. In some cases, if a VM is not using all of its allocated machine memory, the VM is charged an idle tax so some machine memory is taken away from the VM and made available to other VMs or other processes running in the host. The virtual infrastructure may utilize a variety of memory management techniques to support memory over-commitment without significant performance cost to applications executing inside the guest. For example, the virtual infrastructure may enable sharing of memory between VMs in cases where VMs may be running instances of the same guest OS and have the same applications, libraries, and other data in common. In this technique, the virtual infrastructure identifies and eliminates redundant copies of guest "physical" memory pages across VMs. The virtual infrastructure maps the identical guest "physical" pages to the same machine memory page and enables copy-on-write behavior with regards to that machine memory page.

Unfortunately, there are applications and runtimes that do not work well with memory over-commitment and page sharing. Java Virtual Machine (JVM) is one of the most widely used runtimes in this category. A JVM runtime can be a problematic candidate for page sharing because a Java application and its associated class data is typically loaded into memory in a non-deterministic manner, often based on the order in which a Java application refers to class data. As a result, though JVMs executing on separate VMs may utilize the same Java class libraries for different applications, the memory pages storing the Java class libraries may be unsuitable for page sharing.

SUMMARY

One or more embodiments of the present invention provide methods, systems, and computer programs for managing memory in a host system in which virtual machines (VMs) execute.

A method for managing memory of a runtime environment executing on a virtual machine, according to one embodiment, includes generating immutable data associated with execution of an application in the runtime environment and deterministically arranging the immutable data within a first memory page assigned to the runtime environment. The method further includes notifying a virtualization layer that the first memory page containing immutable data is a page sharing candidate.

Embodiments of the present invention provide a computer system for executing an application on a host computer executing one or more virtual machines therein. The computer system includes a system memory comprising a plurality of machine memory pages and a virtualization layer configured to manage page sharing of the plurality of machine memory pages between the one or more virtual machines. The computer system further includes at least one runtime environment executing in a first virtual machine. The runtime environment may include immutable data arranged within one or more machine memory pages associated with the runtime environment such that the one or more machine memory pages may be shared with a process executing in a second virtual machine. The immutable data are associated with execution of an application in the runtime environment.

Further embodiments of the present invention include, without limitation, a non-transitory computer-readable storage medium that includes instructions that enable a processing unit to implement one or more of the methods set forth above or the functions of the computer system set forth above.

DETAILED DESCRIPTION

Figure 1:
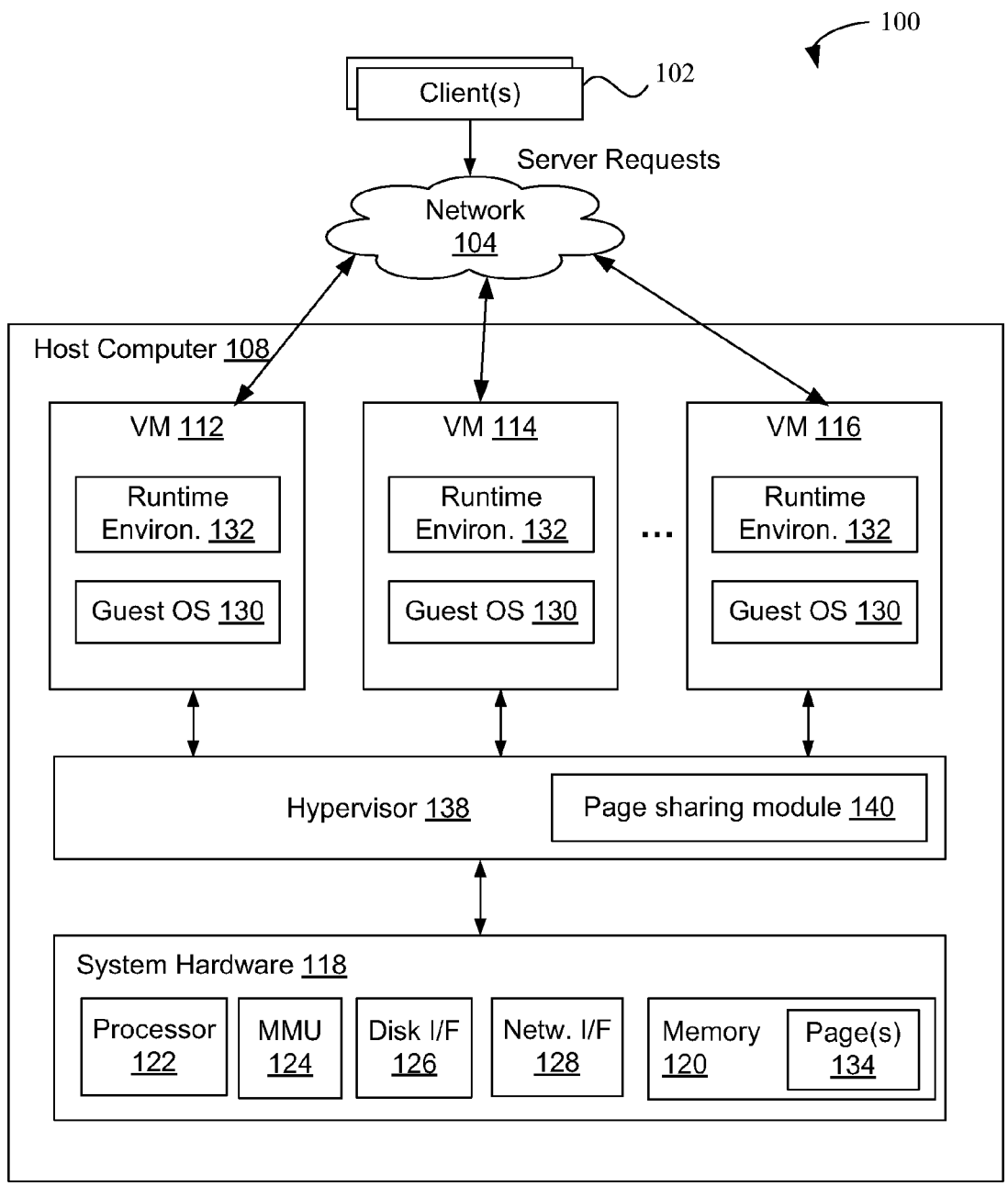
FIG. 1 is a block diagram that illustrates a virtualized computer system with which one or more embodiments of the present invention may be utilized.

FIG. 1 is a block diagram that illustrates a virtualized computer system 100 with which one or more embodiments of the present invention may be utilized. It is contemplated that virtualized computer system 100 may be one of a plurality of virtualized computer systems comprising a cloud-based infrastructure providing server services to one or more clients 102.

Host computer 108 (also referred to as a "server") is configured to support a virtualized environment and to deliver one or more application services related to information technology, including but not limited to, web services, database services, data processing services, and directory services. In the embodiment shown in FIG. 1, host computer 108 is configured to provide Java application server services, as described in detail below.

As in conventional computer systems, host computer 108 includes both system hardware 118 and system software. System hardware 118 generally includes memory 120 (referred to herein as "machine memory"), a processor 122, some form of memory management unit (MMU) 124 (which may be integrated with processor 122), a disk interface 126, and a network interface 128. Machine memory 120 stores data and software such as an operating system and currently running application programs. Generally, MMU 124 is responsible for managing a virtual memory for processes running in host computer 108 by mapping virtual memory pages to machine memory pages. MMU 124 typically divides virtual memory address space and machine memory address space into blocks of contiguous memory addresses referred to as memory pages 134.

Processor 122 may be a single processor, or two or more cooperating processors in a known multiprocessor arrangement. Examples of disk interface 126 are a host bus adapter and a network file system interface. An example of network interface 128 is a network adapter, also referred to as a network interface controller (NIC). In some embodiments, a plurality of NICs is included as network interface 128. It should further be recognized that system hardware 118 also includes, or is connected to, conventional registers, interrupt handling circuitry, a clock, etc., which, for the sake of simplicity, are not shown in the figures.

One or more virtual machines (VMs) are configured within host computer 108, represented in FIG. 1 as VM 112, VM 114, and VM 116, which share the hardware resources of host computer 108. The virtual machines run on top of a software interface layer 138 (referred to herein as a "hypervisor") that abstracts processor, memory, storage, and/or networking resources and enables sharing of system hardware 118 of host computer 108 by the virtual machines. Hypervisor 138 may run on top of the operating system of host computer 108 or directly on hardware components of host computer 108.

In certain embodiments, one or more virtual machines may be configured to provide a server service to plurality of clients 102 based on one or more server requests received via network 104. As depicted in the embodiment of FIG. 1, each virtual machine includes a guest operating system (OS) 130 and one or more guest applications running on top of the guest operating system. Each virtual machine is configured to support a runtime environment 132 running on top of guest OS 130. In the embodiments illustrated herein, runtime environment 132 is a Java Virtual Machine (JVM) although it should be recognized that other runtime environments and/or applications executing on top of the guest OS may be used without departing from the scope of the teachings herein. The embodiments presented should therefore not be interpreted to be exclusive or limiting, but rather exemplary or illustrative.

Figure 2:
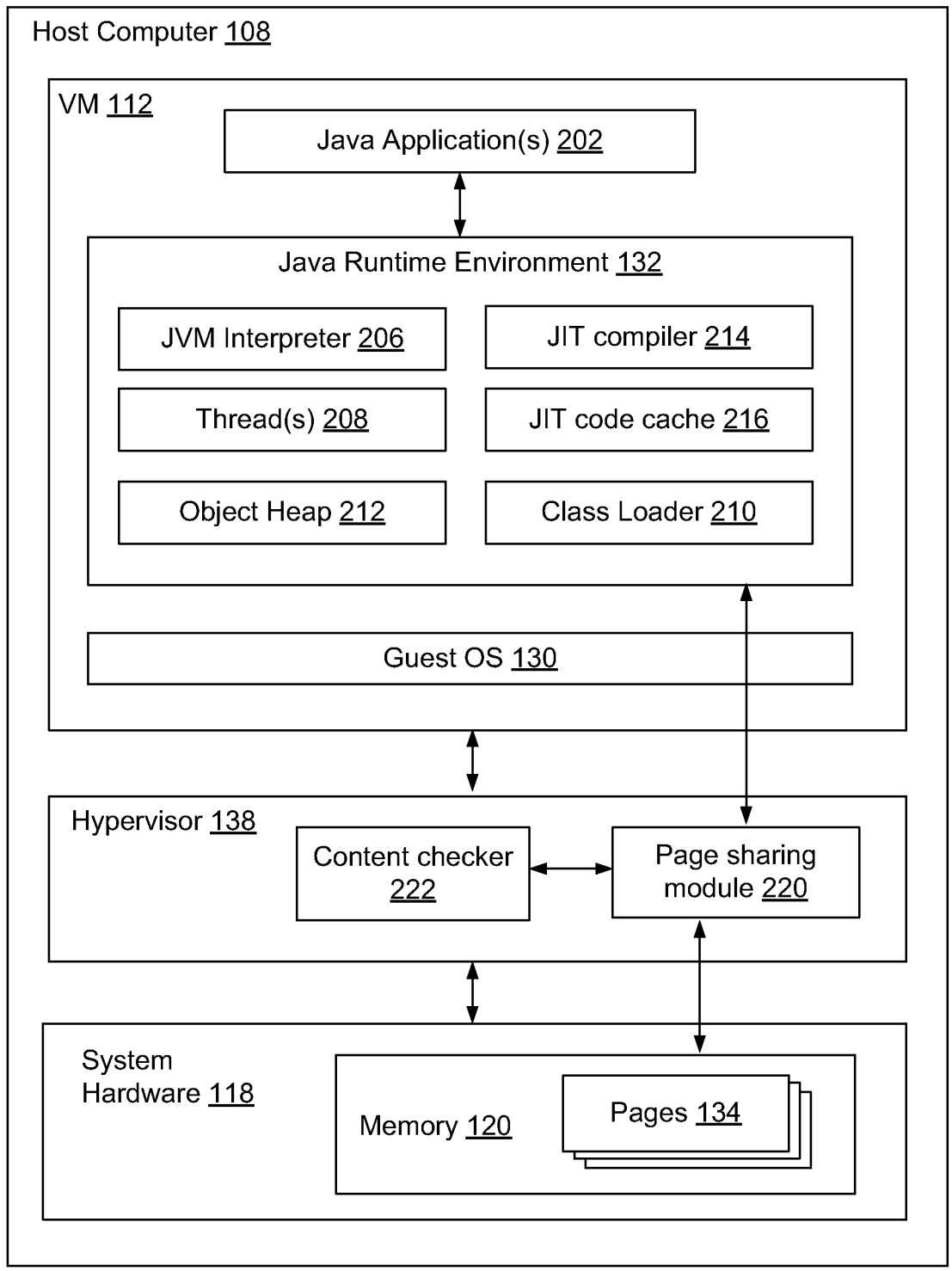
FIG. 2 illustrates, in greater detail, a virtual machine configured to perform memory management techniques, according to one or more embodiments, while executing a runtime environment.

FIG. 2 illustrates, in greater detail, a VM (e.g., VM 112) configured to perform memory management techniques, according to one or more embodiments, while executing a runtime environment 132 (e.g., JVM). Runtime environment 132 is configured to coordinate with hypervisor 138 to utilize perform page sharing procedures on guest "physical" memory pages utilized by runtime environment 132. To simplify the description, description of VMs 114, 116 are omitted but it should be understood that VMs 114, 116 may be configured similarly to VM 112. For clarity of discussion, the term "machine memory" refers to actual hardware memory that is visible to hypervisor 138. The term "guest 'physical' memory" refers to a software abstraction used to provide the illusion of hardware memory to a VM. Guest "physical" memory is generally visible to a guest OS running on a VM. Guest "physical" memory is backed by machine memory and hypervisor 138 provides a mapping from guest "physical" memory to machine memory. The term "guest virtual memory" refers to a continuous virtual address space presented by a guest OS to applications running inside a VM.

As shown, runtime environment 132 includes a variety of components and/or modules for facilitating execution of one or more applications 202. Such components include, but are not limited to, an interpreter 206, one or more process threads 208, a class loader 210, object heap 212, compiler 214, "JIT" code cache 216, and other data structures utilized during execution of application 202. Interpreter 206 is configured to execute software code of application 202. Process threads 208 are assigned to application 202 for scheduling process time with guest OS 130. Class loader 210 is configured to locate libraries, often embodied as class files and/or Java Archive (JAR) files, referenced by code of application 202, and parse and load contents of the libraries into guest "physical" memory. Compiler 214 is configured to perform "just-in-time" compilation (JIT) of bytecode of application 202 and temporarily store the results (e.g., machine code) in code cache 216. Object heap 212 is configured to dynamically store in one or more objects (e.g., Java objects) and other data structures utilized during execution of application 202. It should be recognized that one or more of the components described above may contain a large amount of data that is not modified after the data is created and/or stored in memory. Examples of this data, sometimes referred to as "immutable data," may include "ahead of time" (AOT) compiled code in code cache 216 and class data (e.g., application-level class data, core class libraries and other shared Java libraries) loaded into memory by class loader 210. In one embodiment, the immutable data is generated responsive to executing an application (e.g., application 202) in runtime environment 132 and facilitates the execution thereof.

Runtime environment 132 is configured to coordinate with hypervisor 138 to utilize page sharing techniques on guest "physical" memory pages that are associated with runtime environment 132 and that store data with one or more components described above (e.g., class loader 210, object heap 212). In one embodiment, runtime environment 132 is configured to arrange immutable data of the one or more components in a manner that facilities page sharing with other processes executing on host computer 108, such as other JVMs executing on other VMs 114, 116, as described below in conjunction with FIG. 3. In one example, class loader 210 may be configured to load one or more Java classes into memory in a deterministic manner that enables page sharing of guest "physical" memory pages. In another example, code cache 216 may be configured to arrange compiled code (e.g., from AOT compilation) within guest "physical" memory in a deterministic manner to that enables page sharing of guest "physical" memory pages. In some embodiments, runtime environment 132 is configured to store immutable data associated with an application running therein using self-relative pointers.

Runtime environment 132 is further configured to notify, or "hint to," hypervisor 138 that one or more guest "physical" memory pages storing immutable data may be candidates for page sharing, as performed by page sharing module 220. Runtime environment 132 communicates with hypervisor 138 via a backdoor call and provides a page sharing hint comprising an address of a candidate guest "physical" memory page (e.g., a guest physical page number.) Runtime environment 132 is further configured to generate a hash value of data stored in the candidate guest "physical" memory page and provide this hash value to hypervisor 138 in the page sharing hint.

Hypervisor 138 includes a page sharing module 220 and a content checker 222 to perform a page sharing process, according to one embodiment, on guest "physical" memory pages utilized by VM 112. Page sharing module 220 is configured to re-map guest "physical" memory pages assigned to VM(s) 112 and runtime environments 132 having the same contents to a same machine memory page 134. Content checker 222 is configured to verify that candidate guest "physical" memory pages have the same content by comparing corresponding hash values and/or performing bit-to-bit comparisons.

As described above, runtime environment 132 is configured to arrange immutable data within a guest "physical" memory page such that hypervisor 138 may "share" the machine memory page 134 that corresponds to the guest "physical" memory page with another process (e.g., another runtime environment executing on host computer 108), having an identical guest "physical" memory page of immutable data, by mapping both guest "physical" memory pages to a same machine memory page 134 and marking machine memory page 134 as "copy-on-write".

Figure 3:
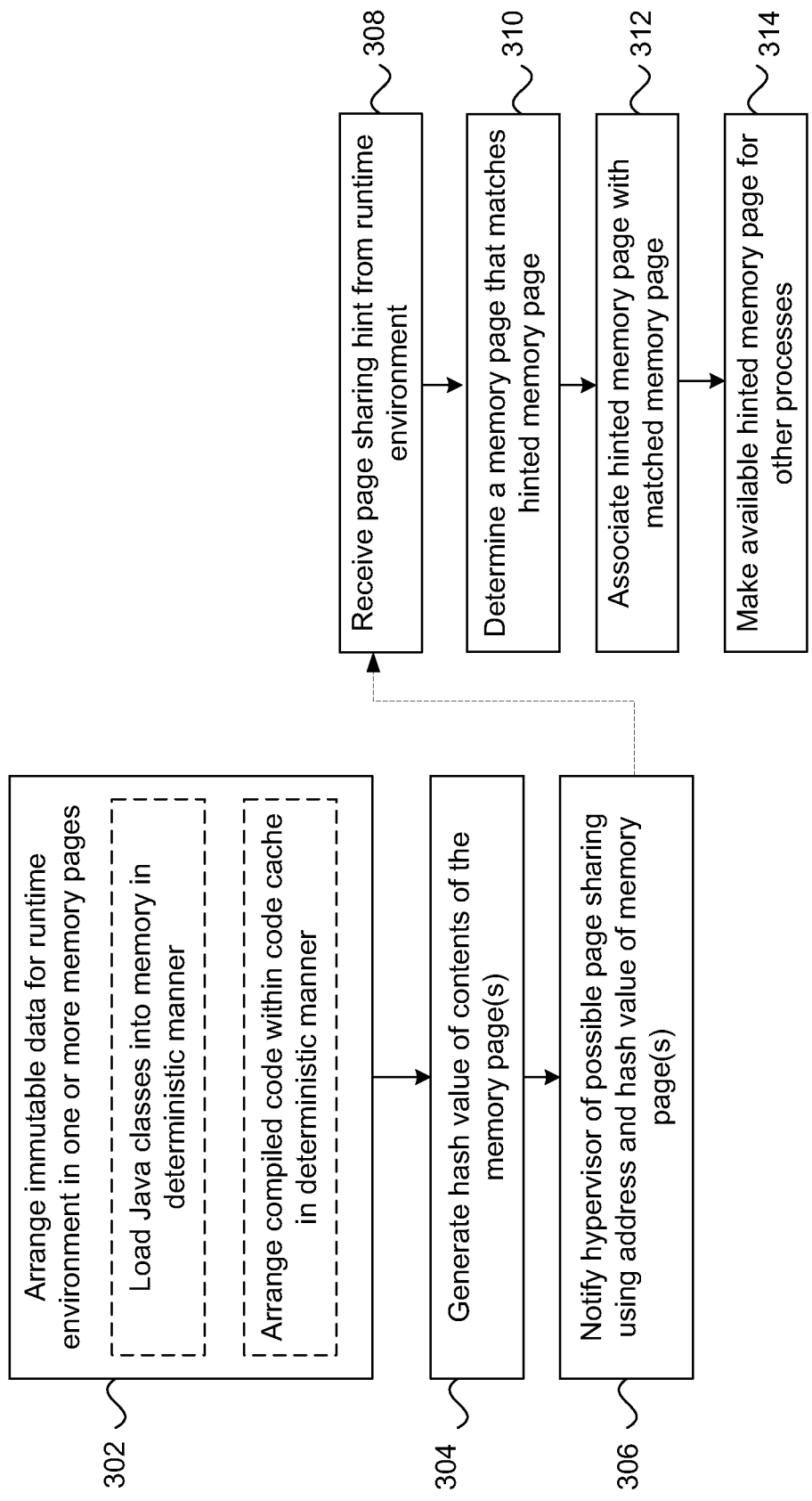
FIG. 3 is a flow diagram that illustrates steps for a method of managing memory assigned to a runtime environment, according to an embodiment of the present invention.

FIG. 3 is a flow diagram that illustrates steps for a method of managing memory assigned to a runtime environment, according to an embodiment of the present invention. According to this embodiment, at step 302, runtime environment 132 arranges immutable data utilized to support execution of an application within runtime environment 132 in one or more guest "physical" memory pages. As described above, the one or more guest "physical" memory pages may contain data for components (e.g., class loader 210, code cache 216) of runtime environment 132. The immutable data is written to the guest "physical" memory pages in a manner that facilities page sharing while still supporting execution of the application in runtime environment 132 by being deterministically laid out in memory, and having identical contents as the same immutable data loaded in another runtime environment (e.g., having another invocation of the application).

In one embodiment, the runtime environment 132 may load Java classes into one or more guest "physical" memory pages such that data for the loaded classes is arranged within the guest "physical" memory that permit usage of page sharing techniques. With prior techniques, class loading is typically performed on demand, such that a library is not loaded until the class is actually used by the program. Also, class loading is typically performed in a recursive manner, such that if a class loader encounters a class reference while loading another class, the class loader recursively invokes itself to load the encountered class. As a result, class loading according to prior techniques often led to an arrangement of class data in memory that varied unpredictably, for example, depending on the order in which a class loader encountered class references within an application or depending on an alphabetical order of string literal labels of each encountered class reference.

Accordingly, in some embodiments, runtime environment 132 may load the one or more Java classes into memory in a deterministic manner such that the arrangement within the guest "physical" memory pages that contain data for the Java classes is determined by which Java classes are loaded, rather than by what order Java classes are discovered or referenced. A procedure of class loading is generally referred to as "deterministic" if, given the same set of Java classes to be loaded, two separate class loaders 210, for example in separate runtime environments 132, would arrange the loaded classes in the same arrangement within memory. As such, the same class data loaded from separate invocations of an application 202 may contain the same bytes. In one embodiment, runtime environment 132 (e.g., via class loader 210) may store the loaded classes in memory in a page-aligned manner such that class data deterministically starts and stops at predetermined page boundaries. For example, runtime environment 132 may align loaded class data to a boundary of a guest "physical" memory page. In one embodiment, runtime environment 132 (e.g., via class loader 210) may arrange the loaded classes within memory using a form of hashing that arranges the class data based on Java classes themselves, rather than by an order in which the Java classes are imported or referenced.

In one embodiment, runtime environment 132 may further store the loaded classes in memory utilizing self-referencing or self-relative pointers, rather than absolute pointers. In conventional JVMs, class data use absolute pointers to other memory in the JVM, which are unlikely to be the same in two invocations of the same Java application. Accordingly, it has been determined that absolute pointers in the immutable data should be avoided. In one embodiment, runtime environment 132 may store references to loaded classes as a relative address (e.g., an offset index) within a guest "physical" memory page. In some embodiments, runtime environment 132 may store loaded class data having self-relative pointers to other memory (e.g., to string tables, to other classes, to the class loader that loaded it) in runtime environment 132. By utilizing relative addresses rather than linking classes with absolute addresses, runtime environment 132 provides a more generalized version of loaded class data that is more likely to be duplicated in another JVM executing on host computer 108.

In one embodiment, runtime environment 132 may arrange compiled code resulting from compilation, such as ahead of time (AOT) or just in time (JIT) compilation, within code cache 216 (i.e., guest "physical" memory corresponding to code cache 216) in a deterministic manner to enable page sharing. In previous approaches, pre-compilation of Java code dynamically determines and anticipates when to pre-compile portions of application 202, for example, by tracking how often a segment of code is executed in a single session. Since code caches typically store compiled code in the order in which the code was generated, prior techniques for caching compiled code have resulted in memory arrangements that vary greatly between executed copies. Accordingly, in one embodiment, runtime environment 132 may page-align cached code with the guest "physical" memory corresponding to the code cache 216. In some embodiments, runtime environment 132 may determine when to release (e.g., flush) or retain cached code in a manner that does not vary according to a particular execution session of application 202. In one embodiment, runtime environment 132 may store compiled code (e.g., AOT compiled code) within code cache 216 utilizing self-relative pointers or pointer slots to other memory in runtime environment 132.

At step 304, runtime environment 132 generates a hash value based on contents of each of one or more guest "physical" memory pages containing immutable data. At step 306, runtime environment 132 notifies hypervisor 138, for example, via a backdoor call, of the one or more guest "physical" memory pages containing immutable data ("hinted memory pages"). The backdoor call may include page address of the hinted guest "physical" memory page (e.g., physical page number, or PPN) and the hash value generated at step 304.

At step 308, hypervisor 138 receives hints of page sharing from runtime environment 132 and provides the hints to page sharing module 220. At step 310, page sharing module 220 determines whether any guest "physical" memory pages utilized by the same or other processes executing on host computer 108 (e.g., a different runtime environment executing on a different VM in host computer 108, etc.) matches the hinted guest "physical" memory page. In one embodiment, page sharing module 220 uses the received hash value to perform a lookup of a hash table having hash values for all guest "physical" memory pages managed by hypervisor 138. Using the hash table, page sharing module 220 identifies any possible guest "physical" memory pages that match the hinted guest "physical" memory page. Page sharing module 220 utilizes content checker 222 to verify that the contents of the hinted guest "physical" memory page and matched guest "physical" memory page are the same.

At step 312, in response to determining that the guest "physical" memory pages contain the same data, page sharing module 220 maps the hinted guest "physical" memory page with the matched guest "physical" memory page to a same machine memory page 134. Page sharing module 220 may modify one or more internal references in a page table to associate the hinted guest "physical" memory page with the matched memory page such that only one copy of the memory page needs be retained within machine memory 120. That is, only one copy of the immutable data needs to be retained within machine memory 120. It is noted that if a later access attempts to modify the shared machine memory page 134, hypervisor 138 immediately makes a copy of the shared memory as per a copy-on-write (COW) technique. At step 314, hypervisor 138 reclaims a machine memory page 134 previously utilized by the hinted guest "physical" memory page assigned to runtime environment 132 and makes the de-allocated machine memory page available to other processes executing on host system 108, such as other VMs and/or other runtime environments 132.

It should be recognized that embodiments of the present invention may include various implementations to enable the immutable data of an application executing in a runtime environment to be page shared within memory. For example, in one implementation, to ensure immutable data is deterministically laid out in memory, class data and compiled code (e.g., AOT data) for a particular application may be pre-compiled into an immutable flat file that is loaded into memory by each runtime environment executing the particular application. In such an implementation, the immutable data may use self-referencing pointers relative to the immutable flat file. For example, class data may include self-referencing pointers to other class data relative within the immutable flat file. Similarly, compiled code (e.g., AOT data) may include self-referencing pointers to other data within the immutable flat file. In another embodiment, runtime environment 132 may be configured to write a repeatable and easily sharable byte sequence (such as zeroes) in order to share unused memory that the runtime environment does not want to free back to the operating system. For example, the runtime environment may zero out guest "physical" memory pages associated with immutable data that is no longer being used by runtime environment 132 and hint to hypervisor 138 that such zeroed memory pages may be candidates for page sharing.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. For example, while the foregoing descriptions have generally discussed runtime environment 132 within a VM that utilizes and works with guest "physical" pages (e.g., communicating addresses or other hints of guest "physical" memory pages to hypervisor 138 in step 306, etc.), it should be recognized that runtime environment 132 may itself execute within a guest "virtual" memory space (e.g., as provided to it by guest OS 130) and may therefore communicate with guest OS 130 (or drivers running within guest OS 130) in order to obtain references to guest "physical" memory pages that correspond to its own guest virtual "memory" pages. In alternative embodiments, runtime environment 132 may generally utilize guest virtual memory pages rather than guest "physical" memory pages and the backdoor call mechanisms (e.g., hypervisor-aware drivers within guest OS 130, etc.) utilized by runtime environment 132 to communicate with hypervisor 138 that may translate guest virtual memory page references received from runtime environment 132 to guest "physical" memory page references prior to providing them to hypervisor 138. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for managing memory of a runtime environment executing in a virtual machine, the method comprising:
generating immutable data associated with execution of an application in the runtime environment;
deterministically arranging the immutable data within a first memory page assigned to the runtime environment; and
notifying a virtualization layer that the first memory page containing the immutable data is a page sharing candidate.

2. The method of claim 1, wherein the deterministically arranging the immutable data within the first memory page comprises:
aligning class data associated with the application to a boundary of the first memory page.

3. The method of claim 1, wherein the deterministically arranging the immutable data within the first memory page comprises:
storing a relative reference to class data associated with the application within the first memory page.

4. The method of claim 1, wherein the deterministically arranging the immutable data within the first memory page comprises:
aligning machine code to a boundary of the first memory page, wherein the machine code is compiled according to bytecode associated with the application.

5. The method of claim 1, wherein the deterministically arranging the immutable data within the first memory page comprises:
storing a relative reference to machine code within a code cache of the runtime environment within the first memory page, wherein the machine code is compiled according to bytecode associated with the application.

6. The method of claim 1, wherein the first memory page comprises a guest physical memory page managed by a guest operating system executing in the virtual machine, the guest physical memory page mapped to a machine memory page managed by the virtualization layer.

7. The method of claim 1, wherein the first memory page comprises a guest virtual memory page managed by a guest operating system executing in the virtual machine, the step of notifying including translating the guest virtual memory page to a guest physical memory page, the guest physical memory page mapped to a machine memory page managed by the virtualization layer.

8. The method of claim 1, wherein the step of notifying includes providing a hash value generated based on contents of the first memory page to the virtualization layer.

9. A computer system for executing an application on a host computer executing one or more virtual machines therein, the computer system comprising
a system memory comprising a plurality of machine memory pages; and
a virtualization layer configured to manage page sharing of the plurality of machine memory pages between the one or more virtual machines; and
a runtime environment executing in a first virtual machine, the runtime environment having immutable data deterministically arranged within one or more machine memory pages associated with the runtime environment such that the one or more machine memory pages may be shared with a process executing in a second virtual machine, wherein the immutable data is associated with execution of an application in the runtime environment.

10. The computer system of claim 9, wherein the runtime environment is configured to align class data associated with the application to a boundary of the one or more machine memory pages.

11. The computer system of claim 9, wherein the runtime environment is configured to store a relative reference to class data associated with the application within the one or more machine memory pages.

12. The computer system of claim 9, wherein the runtime environment is configured to align machine code to a boundary of the one or more machine memory pages, wherein the machine code is compiled according to bytecode associated with the application.

13. The computer system of claim 9, wherein the runtime environment is configured to store a relative reference to machine code within a code cache of the runtime environment within the one or more machine memory pages, wherein the machine code is compiled according to bytecode associated with the application.

14. A non-transitory computer-readable storage medium comprising instructions that, when executed in a computing device, manage memory of a runtime environment executing in a virtual machine by performing the steps of:
generating immutable data associated with execution of an application in the runtime environment;
deterministically arranging the immutable data within a first memory page assigned to the runtime environment; and
notifying a virtualization layer that the first memory page containing the immutable data is a page sharing candidate.

15. The non-transitory computer-readable storage medium of claim 14, wherein the instructions for deterministically arranging immutable data within the first memory page further comprises instructions for:
aligning class data associated with the application to a boundary of the first memory page.

16. The non-transitory computer-readable storage medium of claim 14, wherein the instructions for deterministically arranging immutable data within the first memory page further comprises instructions for:
storing a relative reference to class data associated with the application within the first memory page.

17. The non-transitory computer-readable storage medium of claim 14, wherein the instructions for deterministically arranging immutable data within the first memory page further comprises instructions for:
aligning machine code to a boundary of the first memory page, wherein the machine code is compiled according to bytecode associated with the application.

18. The non-transitory computer-readable storage medium of claim 14, wherein the instructions for deterministically arranging immutable data within the first memory page further comprises instructions for:
storing a relative reference to machine code within a code cache of the runtime environment within the first memory page, wherein the machine code is compiled according to bytecode associated with the application.

19. The non-transitory computer-readable storage medium of claim 14, wherein the first memory page comprises a guest physical memory page managed by a guest operating system executing in the virtual machine, the guest physical memory page mapped to a machine memory page managed by the virtualization layer.

20. The non-transitory computer-readable storage medium of claim 14, wherein the first memory page comprises a guest virtual memory page managed by a guest operating system executing in the virtual machine, the step of notifying including translating the guest virtual memory page to a guest physical memory page, the guest physical memory page mapped to a machine memory page managed by the virtualization layer.

* * * * *